(12) United States Patent
Burchill et al.

(10) Patent No.: US 9,455,929 B2
(45) Date of Patent: Sep. 27, 2016

(54) DEVICE AND METHOD FOR BLOCK DATA TRANSFER OVER WIRELESS COEXISTENCE INTERFACE

(71) Applicant: APPLE INC., Cupertino, CA (US)

(72) Inventors: William Burchill, Cupertino, CA (US); Paul Flynn, Cupertino, CA (US); Wen Zhao, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 23 days.

(21) Appl. No.: 13/930,718

(22) Filed: Jun. 28, 2013

(65) Prior Publication Data

US 2015/0003321 A1 Jan. 1, 2015

(51) Int. Cl.
*H04L 12/865* (2013.01)
*H04L 12/851* (2013.01)

(52) U.S. Cl.
CPC ......... *H04L 47/6275* (2013.01); *H04L 47/245* (2013.01)

(58) Field of Classification Search
None
See application file for complete search history.

(56) References Cited

U.S. PATENT DOCUMENTS

| | | | |
|---|---|---|---|
| 2005/0215197 A1* | 9/2005 | Chen et al. | 455/41.2 |
| 2006/0292987 A1 | 12/2006 | Ophir et al. | |
| 2008/0043705 A1* | 2/2008 | Desai et al. | 370/346 |
| 2008/0192806 A1 | 8/2008 | Wyper et al. | |
| 2008/0233875 A1 | 9/2008 | Desai et al. | |
| 2009/0054009 A1 | 2/2009 | Yang et al. | |
| 2009/0176454 A1* | 7/2009 | Chen et al. | 455/63.1 |
| 2010/0166015 A1* | 7/2010 | Van Greunen et al. | 370/474 |
| 2013/0064321 A1* | 3/2013 | Kopp | G06F 13/4282 375/295 |
| 2014/0056277 A1* | 2/2014 | HomChaudhuri | H04W 72/1257 370/330 |

* cited by examiner

*Primary Examiner* — Afshawn Towfighi
(74) *Attorney, Agent, or Firm* — Fay Kaplun & Marcin, LLP

(57) ABSTRACT

A device and method transmits a data block over a wireless coexistence interface (WCI) pathway. The method includes generating a data block for transmission between a cellular chip and an Industrial, Scientific, and Medical (ISM) chip. The method includes converting the data block into messages, the messages having a format corresponding to the WCI pathway, the WCI pathway directly communicatively connecting the cellular chip and the ISM chip, the format including an indication of a message type. The method includes transmitting the messages over the WCI pathway. The method includes generating the data block based upon a concatenation of the messages.

22 Claims, 4 Drawing Sheets

DEVICE AND METHOD FOR BLOCK DATA TRANSFER OVER WIRELESS COEXISTENCE INTERFACE

BACKGROUND INFORMATION

A station may be configured to communicate wirelessly using a transceiver. The transceiver may include a cellular chip such that the station may communicate wirelessly with a cellular network operating in any of the bands used by cellphones, including, but not limited to, cellphone bands adjacent to the Industrial, Scientific, and Medical (ISM) band. The transceiver may also include a Bluetooth, WiFi, or combined Bluetooth/WiFi chip (hereinafter "ISM chip") operating in the 2.4 GHz ISM band as well as operating in the 5 GHz band for WiFi.

During operation of the receiver, interference between the cellular and ISM chips must be carefully controlled so that both may appear to operate simultaneously from the user's viewpoint. To achieve this coordination, short real-time messages (e.g., 1 or 2 byte real-time messages), via a direct pathway, such as, but not limited to, the WCI(2) interface, between the chips may be used. However, when a large block of structured data with further information relevant to the operation of the chips is required to be exchanged therebetween, an applications processor is required as an intermediary to provide a mechanism for transporting blocks of structured data, and to avoid impairment of the byte-oriented real time interface. However, the applications processor introduces a relatively large latency, greater power requirements, etc. For example, long battery life is achieved by having the applications processor be dormant (sleep) as much as possible, and should not be woken (consume power) for message transport between the cellular and WiFi chips.

Thus, there is a need to utilize the direct pathway between the chips such that these large data packets may be transmitted therebetween.

DETAILED DESCRIPTION

Figure 1:
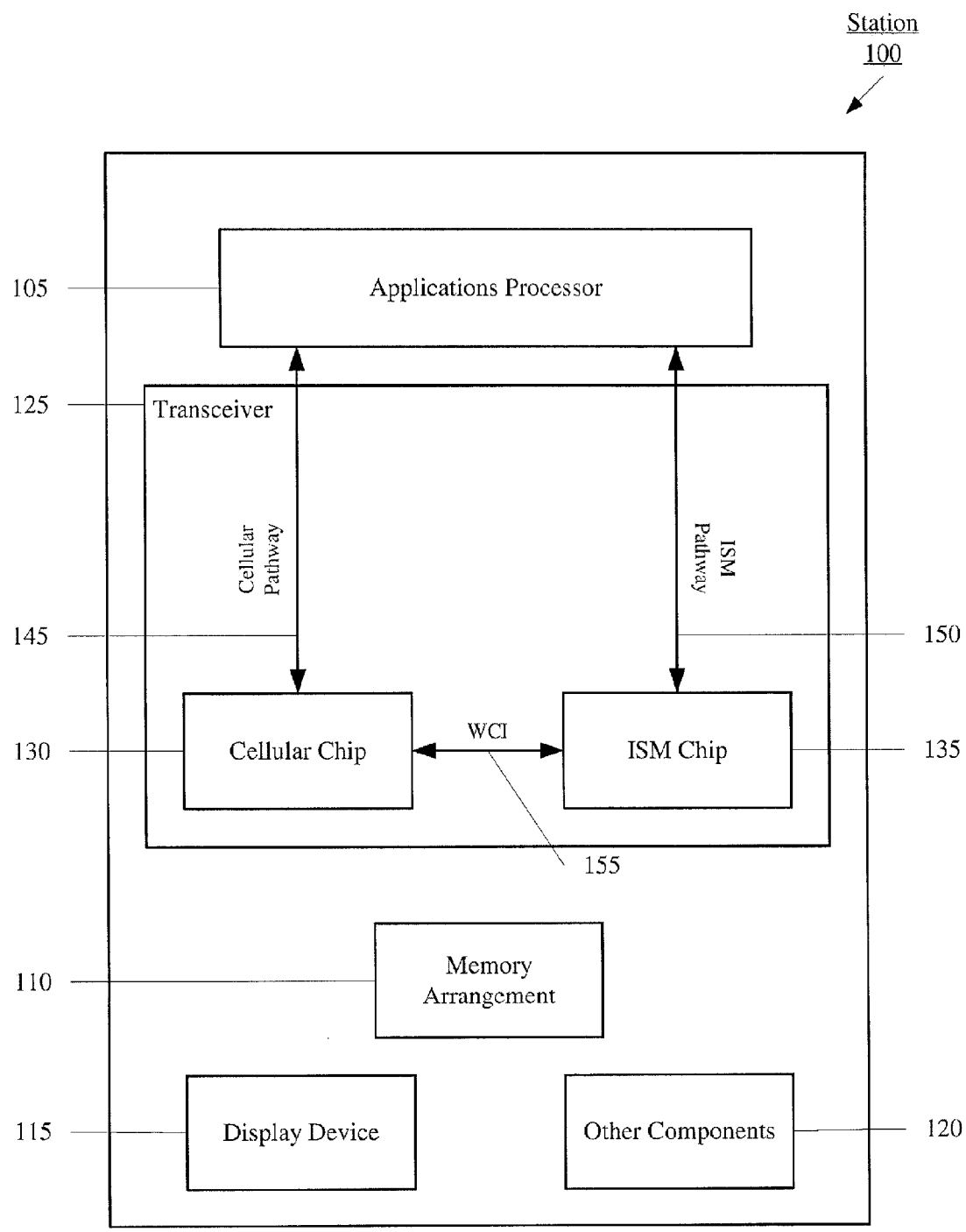
FIG. 1 shows an exemplary station configured to transmit data using a wireless coexistence interface (WCI).

The exemplary embodiments relate to a device and method transmitting a data block over a wireless coexistence interface (WCI) pathway. The method comprises generating a first data block for transmission between a cellular chip and an Industrial, Scientific, and Medical (ISM) chip; converting the first data block into a plurality of first messages, the first messages having a format corresponding to the WCI pathway, the WCI pathway directly communicatively connecting the cellular chip and the ISM chip, the format including an indication of a message type, the first messages being a first message type; transmitting the first messages over the WCI pathway; and generating the first data block based upon a concatenation of the first messages.

The exemplary embodiments may be further understood with reference to the following description and the related appended drawings, wherein like elements are provided with the same reference numerals. The exemplary embodiments are related to a device and method for transmitting a large data block over a wireless coexistence interface (WCI) pathway directly between a cellular chip and an ISM chip. Specifically, the WCI pathway bypasses an applications processor that ordinarily provides the functionality of transmitting the large data block between the chips. A WCI data block may be formatted in a manner for the data included therein to be subsequently extracted by the receiving chip. The WCI pathway, the cellular chip, the ISM chip, the real-time messages, the large data block, the WCI data block format, and a related method will be described in further detail below.

A station may be equipped with a cellular chip and an ISM chip such that wireless communications may be performed on different frequency channels corresponding to the network type associated with the wireless communications. Real-time messages communicated between the cellular chip and the ISM chip may determine the manner in which the chips operate. For example, the real-time messages may indicate when one of the chips operates such that the other chip does not interfere with this operation. When non-real-time messages or longer data messages are required to be transmitted between the chips, the use of an applications processor is required for these longer data messages to be properly transmitted. However, the applications processor being a separate component that performs its own functionalities has several drawbacks. In a first example, the applications processor requires power to operate. Accordingly, when a limited power supply such as a battery is being utilized, the applications processor draws the energy from this supply which decreases a total available power for other components of the station and reduces the battery life of the station. In a second example, to conserve this extra needed power, the applications processor may be configured with various settings to decrease its power consumption such as being placed in hibernation or asleep. Therefore, when the applications processor is eventually required, there is additional time that is needed for the applications processor to wake. In contrast, the WCI pathway that is utilized for the control messages such that a direct exchange between the cellular chip and the ISM chip may be performed does not have the drawbacks that are associated with using the applications processor for the exchange. However, this WCI pathway is currently configured and used only for real-time messages which are one or two characters in length. The exemplary device and method provide for a manner of utilizing the WCI pathway to further exchange the larger data blocks that ordinarily requires the applications processor.

It should be noted that the exchange of the large data block over the WCI pathway may relate to the conditions described above when the applications processor is not readily available. However, if the applications processor is awake, the large data block may be transmitted via the applications processor instead of using the WCI pathway. The applications processor may provide a relatively more reliable manner of transmitting the large data block as well as being capable of handling a relatively large amount of data effectively. Accordingly, the applications processor may continue to be utilized when the conditions present at the time of transmission of the large data block are satisfied (e.g., applications processor is awake, sufficient power supply, etc.).

FIG. 1 shows an exemplary station 100 configured to transmit data using the WCI pathway. The station 100 may represent any electronic device that is configured to perform wireless functionalities. For example, the station 100 may be a portable device such as a cellular phone, a smartphone, a tablet, a laptop, etc. In another example, the station 100 may be a stationary device such as a desktop terminal. The station 100 may be configured to communicate wirelessly using a variety of different frequencies. That is, the station 100 includes components corresponding to the various frequencies and wireless communications networks in which the wireless communication is to be performed. Accordingly, the station 100 is configured to enable coexistence between multiple wireless technologies within a single device. The station 100 may include an applications processor 105, a memory arrangement 110, a display device 115, other components 120, and a transceiver 125.

The applications processor 105 may be configured to execute a plurality of applications of the station 100. For example, the applications may include a web browser when connected to a communication network via the transceiver 125. The memory 110 may be a hardware component configured to store data related to operations performed by the station 100. Specifically, the memory 110 may store wireless operation data (e.g., frequencies in which the chips operate). The display device 115 may be a hardware component configured to show data to a user while the other components 120 may include a portable power supply (e.g., battery) if the station 100 is portable, a data acquisition device, ports to electrically connect the station 100 to other electronic devices, an input/output device, etc.

The transceiver 125 may be a hardware component configured to transmit and/or receive data. That is, the transceiver 125 may enable communication with other electronic devices directly or indirectly through a network based upon an operating frequency of the network. The transceiver 125 may operate on a variety of different frequencies or channels (e.g., set of consecutive frequencies) that are related to a cellular network and a WiFi network. The transceiver 125 may also perform wireless functionalities for short range communications such as Bluetooth. Accordingly, the transceiver 125 may include a cellular chip 130 for the wireless functionalities related to the cellular network and an ISM chip 135 for the wireless functionalities related to the WiFi network and the Bluetooth communications.

The components of the station 100 may be disposed at least partially on an integrated circuit board (ICB). Accordingly, the cellular chip 130, the ISM chip 135, and the applications processor 105 may be disposed on the ICB in which pathways may also exist between these components. For example, a cellular pathway 145 may be disposed to connect the cellular chip 130 to the applications processor 105 while an ISM pathway 150 may be disposed to connect the ISM chip 135 to the applications processor 105. In another example, a WCI pathway 155 may be disposed to connect the cellular chip 130 to the ISM chip 135. Those skilled in the art will understand the manner in which the cellular chip 130, the ISM chip 135, and the applications processor 105 may be disposed on the ICB as well as the manner in which the pathways 145, 150, 155 may be provided for the interconnections. Therefore, the pathways 145, 150, 155 provide an exemplary respective manner for data to be exchanged between the components of the transceiver 125.

As discussed above, the transceiver 125 may operate on a variety of different frequencies or channels. The cellular chip 130 may provide the functionalities such that the wireless functionalities related to the cellular network may be performed. The ISM chip 135 may provide the functionalities such that the wireless functionalities related to the WiFi network and/or the short range communications may be performed. Those skilled in the art will understand that the ISM chip 135 may be provided for the WiFi network but may be adjusted such that the ISM chip 135 is also provided for the short range communications as the WiFi network and the short range communications operate in a high-band frequency range.

The applications processor 105 may be configured for non-real-time messages to be transmitted between the cellular chip 130 and the ISM chip 135. Specifically, the applications processor 105 is provided to control high-level actions between the cellular chip 130 and the ISM chip 135. That is, the applications processor 105 provides an intermediary for a large data block including more than two characters to be transmitted between the cellular chip 130 and the ISM chip 135. For example, the cellular chip 130 may generate a data block to be transmitted to the ISM chip 135. A conventional manner for this type of transmission includes transmitting the data block from the cellular chip 130 to the applications processor 105 via the cellular pathway 145 then to the ISM chip 135 via the ISM pathway 150. The applications processor 105 may be configured to indicate to the cellular chip 130 and the ISM chip 135 when it is awake, when it is going asleep, when it is waking, etc. such that the cellular chip 130 and the ISM chip 135 are aware of the status of the applications processor 105.

The WCI pathway 155 is designed for the transmission of one or two character real-time messages between the cellular chip 130 and the ISM chip 135. That is, a direct connection is established between these components for the real-time messages to be exchanged. The real-time messages may relate to information on the manner in which the cellular chip 130 and the ISM chip 135 are to operate. For example, the information may be a single-character, real-time, control information or two-character data. The cellular chip 130 may generate a real-time message to indicate to the ISM chip 135 that the cellular chip 130 is to begin transmitting, begin receiving, end transmitting, end receiving, etc. The conventional manner of utilizing the WCI pathway 155 is not suitable nor intended for an asynchronous transfer of a large data block (e.g., more than two characters) as this may result in either blocking real-time messages until the transfer of the large data block was complete or that the real-time messages may become intermingled with the asynchronous transmission of the large data block which may result in a loss of the real-time message among the large data block.

Figure 2:
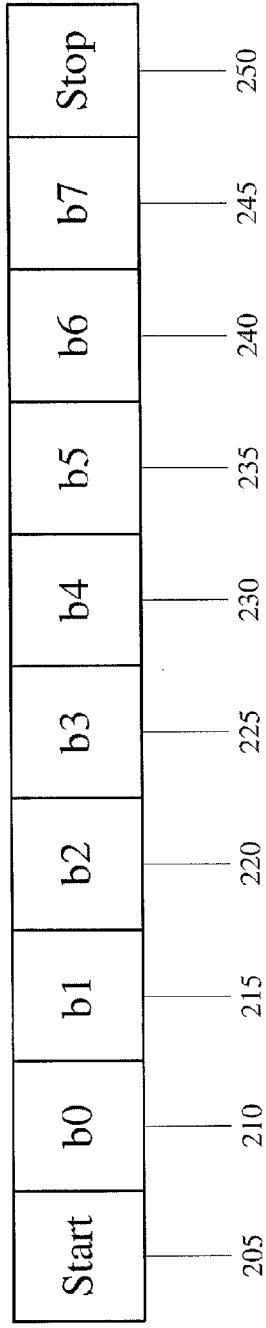
FIG. 2 shows a Universal Asynchronous Receiver/Transmitter (UART) used in the WCI.

The WCI pathway 155 has been designed by the Bluetooth Special Interest Group (SIG) such that a specified data packet is utilized for the one or two character real-time message. FIG. 2 shows a Universal Asynchronous Receiver/Transmitter (UART) message 200 used in the WCI pathway 155. The UART may be a piece of computer hardware that translates data between parallel and serial forms. The UART message 200 is used in conjunction with communication standards such as EIA, RS-232, RS-422 or RS-485. A universal designation indicates that the data format and transmission speeds are configurable. The electric signaling levels and methods (e.g., differential signaling) are handled by a driver circuit external to the UART. The UART is usually an individual (or part of an) integrated circuit used for serial communications over a computer or peripheral device serial port. As a hardware component, the device and method described herein may be embodied utilizing hardware only. However, the manner in which the transmission of large data blocks over the WCI pathway 155 via a plurality of UART messages 200 may also be embodied as software only or a combination of hardware and software.

The UART message 200 is a data packet including ten bits 205-250. As those skilled in the art will understand, each bit may include a Boolean value in which the bit has a value of 0 or 1. Using the Boolean values for the bits, the first bit 205 indicates a start of the UART message 200 while the last bit 250 indicates a stop of the UART message 200. The bits 210-245 are specialized in the manner in which the UART message 200 is utilized. The bits 210-220 are utilized to indicate a type of the message. Again, using the Boolean values in different permutations in the bits 210-220, eight different message types may be indicated (i.e., $2^3$ permutations). The remaining bits 225-245 may be utilized to indicate the control information or data.

The Bluetooth SIG has designed the WCI pathway 155 to utilize the UART message 200 in a specialized manner. Specifically, the eight different message types may be used. For illustrative purposes, a first group of message types are denoted as Type X to include message types 0, 1, and 3-7. A second message type is denoted as Type 2. The standard set forth by the Bluetooth SIG indicates that the Type X message is one character long, thereby being one UART message 200. The Type 2 message is the only exception in which it is two characters long, thereby being two UART messages 200. Despite being two characters long, the Type 2 message only carries one byte of data. Specifically, the bit 225 specifies a least significant nibble (or bit) when the Boolean value is set to 0 and the most significant nibble (or bit) when the Boolean value is set to 1. The bits 230-245 carry the nibble. In this manner, two UART messages 200 are utilized in the Type 2 message to carry one byte of data.

Figure 3:
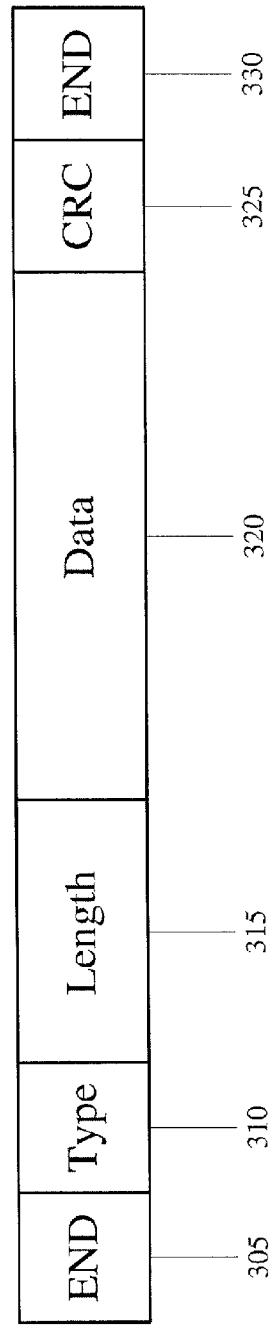
FIG. 3 shows an exemplary WCI data block transmitted between a cellular chip and an ISM chip via the WCI.

Given the above explanation of the WCI pathway 155 and the UART 200, the description herein provides a manner in which a large data block may be transmitted between the cellular chip 130 and the ISM chip 135 via the WCI pathway 155. Specifically, the large data block is formatted into a plurality of UART messages 200 as a Type 2 message. FIG. 3 shows an exemplary WCI data block 300 transmitted between the cellular chip 130 and the ISM chip 135 via the WCI pathway 155. The WCI data block 300 is an aggregate concatenation of the data included in multiple UART messages 200 that are identified as Type 2 messages. The WCI data block 300 may have a Type-Length-Value (TLV) format that includes a first end field 305, a type field 310, a length field 315, a data field 320, a checksum field (indicated as a cyclic redundancy check (CRC) field 325), and a second end field 330. It should be noted that any checksum may be utilized but for illustrative purposes, a CRC is used.

Initially, the WCI pathway 155 may be utilized by incorporating a priority mechanism for types of messages including Type X messages and the WCI data block 300 as a Type 2 message transmitted between the cellular chip 130 and the ISM chip 135. The bits 210-220 may be used to indicate the message type. The priority mechanism may be implemented in the hardware of the UART but may also be implemented in software or a combination thereof. The priority mechanism indicates that Type 2 messages are set to a lowest priority. That is, any Type X message has a higher priority than the Type 2 message. Accordingly, when a Type X message exists, this message takes precedence for transmission across the WCI pathway 155 over any Type 2 message that may exist. Furthermore, when a Type X message exists, this message takes precedence for transmission across the WCI pathway 155 such that if Type 2 messages are being transmitted, the Type 2 message is suspended until the Type X message has been transmitted. Therefore, the transmission of any Type X message is never interrupted to transmit a Type 2 message.

The following provides an exemplary manner of transmitting messages over the WCI pathway 155. A corresponding manner for processing the messages at the receiving end is also described in further detail below. An exemplary implementation for the priority mechanism to be used is to generate two or more queues. For illustrative purposes, two queues will be described below. A first queue may include all Type 2 messages. As will be described in further detail below, the WCI data block 300 may include a plurality of Type 2 messages. All these Type 2 messages may be placed in the first queue in a predetermined order. A second queue may include all Type X messages. As Type X messages include a single character or one UART message 200, the Type X messages may each be placed into the second queue. For example, the Type X messages may be placed into the second queue on a first come, first serve basis such that a first Type X message that is generated prior to a second Type X message is placed ahead of the second Type X message. In another example, the Type X messages may be placed into the second queue depending on the corresponding priority among the Type X messages. It should be noted that further queues may be used for each Type X message. As seven Type X messages exist, seven queues may be created for each Type X message.

Since the Type 2 message has the lowest priority, the first queue also has a lower priority than the second queue which includes Type X messages. The priority mechanism may include a check to determine whether any messages are included in the first and second queues. If any Type X message is included in the second queue, these Type X messages take precedence for transmission. Therefore, the first queue including the Type 2 messages are deferred until all Type X messages in the second queue are transmitted. Only when all the Type X messages in the second queue are transmitted will the Type 2 messages in the first queue be allowed for transmission.

When the second queue is empty (no Type X messages), the Type 2 messages in the first queue may begin transmission. During the course of transmitting the Type 2 messages in the first queue, the priority mechanism may check whether a Type X message has been placed in the second queue. If a Type X message has been placed in the second queue, the first queue may suspend transmission of the Type 2 messages. As the Type X message has priority, the Type X message is transmitted immediately. When the priority mechanism again determines that the second queue is empty, the Type 2 messages may continue to be transmitted.

As described above, the WCI data block 300 may be a TLV format including the first end field 305, the type field 310, the length field 315, the data field 320, the CRC field 325, and the second end field 330. Each field may describe or provide a functionality respective of the WCI data block 300. Again, the WCI data block 300 may include descriptive data of the WCI data block itself as well as the block data represented as a concatenation of the bytes transmitted through the UART message 200.

The type field 310 may describe a type of the large block data message. That is, the type field 310 is different from the type of message described above for the UART message 200. Accordingly, the type field 310 may be any indication regarding the functionalities of the cellular chip 130 and the ISM chip 135 that excludes the control information that is transmitted as real-time Type X messages. The type field 310 may indicate, for example, a list of active LTE channels, WiFi scanning frequencies, coexistence algorithm parameters, non-real-time command messages, etc. The type field 310 may be 1 byte long (i.e., 2 hex characters or 2 UART messages 200). However, it should be noted that the type field 310 may also be 2 bytes long (i.e., 4 hex characters or 4 UART messages 200).

The length field 315 may indicate a total length of the data field 320 and the CRC field 325. Specifically, the length field 315 indicates the total bytes of data in the data field 320 and the CRC field 325. For example, if the data field 320 includes 1000 bytes of data and the CRC field 325 is 1 byte, the length field 315 indicates that the total length is 1001 bytes. It should be noted that the length field 315 indicating the total bytes is only exemplary. The length field 315 may also indicate the total number of UART messages 200. Using the same example above, with 1000 bytes of data and as Type 2 messages, the data field 320 utilizes 2000 UART messages 200. With the CRC field 325 being 1 byte and as Type 2 messages, the CRC field 325 utilizes 2 UART messages 200. Therefore, the length field 315 may indicate that the total length is 2002 UART messages 200. The length field 315 may be 2 bytes long (i.e., 4 hex characters or 4 UART messages 200). However, it should be noted that the length field may also be 1 byte long (i.e., 2 hex characters or 2 UART messages 200). It should also be noted that the length field 315 only indicating the total length of the data field 320 and the CRC field 325 is only exemplary. For example, when assuming that the length field 315 and the presence of the first end 305 and the second end 330 are always present in the WCI data block 300, the total length may simply be the data field 320 and the CRC field 325. However, the length field 315 may also indicate the total length of the WCI data block 300, inclusive of the bytes of at least one of the first end field 305, the type field 310, the length field 315 itself, and the second end field 330.

The data field 320 may be the actual data of the large data packet. The data field 320 may have a number of bytes in which each byte is divided into two UART messages 200. As will be described in further detail below, upon transmission of each UART message 200 of the WCI data block 300, the large data packet may be reassembled through another concatenation of the bytes included in the UART messages 200. As the data field 320 depends upon the data to be transmitted, the bytes are also dependent upon this data. As a Type 2 message, there will always be two UART messages 200 for each byte of the data field 320.

The CRC field 325 may alternatively be a checksum to indicate whether the WCI data block 300 from the transmission of the UART messages 200 via the WCI pathway 155 has been properly reassembled. Those skilled in the art will understand the manner in which the CRC 325 may provide this indication. Again, any CRC or checksum may be used. The CRC field 325 may be 1 byte (i.e., 2 hex characters or 2 UART messages 200). However, it should be noted that the CRC field 325 may also be 0 bytes, 1 byte, 2 bytes, 3 bytes, or 4 bytes as calculated over the aggregate of the type field 310, the length field 315, and the data field 325.

The first end field 305 and the second end field 330 may identify the beginning and the end of the WCI data block 300 in the TLV format. As shown in FIG. 3, the first end field 305 is at a starting end of the WCI data block 300 while the second end field 330 is at an ending end of the WCI data block 300. The first end field 305 and the second end field 330 may relate to a serial line interface protocol (SLIP) such that the beginning and end of the WCI data block 300 is known. It should be noted that each WCI data block 300 may not necessarily include its own first end field 305 and second end field 330. For example, when multiple WCI data block 300 are transmitted, the first end field 305 may be the indication of the beginning of a WCI data block 300 but may also be the indication of the end of a prior WCI data block 300. In a substantially similar manner, the second end field 330 may be the indication of the end of the same WCI data block 300 but may also be the indication of the beginning of an ensuing WCI data block 300.

When the first end field 305 is known, the type field 310 and the length field 315 may also be known as the TLV format utilizes a fixed configuration of the first end field 305, followed by the type field 310, and followed by the length field 315. The data field 320 may also be identified as the set of bytes following the length field 315. As the data field 320 may vary in size, the location of the CRC field 325 may be initially unknown but easily determined from the length field 315.

The SLIP may be very lightweight such that a minimum number of bytes are utilized. Accordingly, the first end field 305 and the second end field 330 may be 1 byte each. A suitable SLIP that may be used is defined, for example, in RFC 1055. RFC 1055 utilizes four specially defined characters: END, ESC, ESC_END, and ESC_ESC. The data to be encapsulated in the TLV format of the WCI data block 300 may be prefixed and suffixed by the END character (as shown in FIG. 3). The prefix and suffix identifies the beginning and end of the message block including the type field 310, the length field 315, the data field 320, and the CRC field 325. It should be noted that the message block or the data field 320 may coincidentally utilize END or ESC characters within the WCI data block 300. In light of this possibility, the END character appearing in the WCI data block 300 may be replaced with the sequence ESC ESC_END while the ESC character appearing in the WCI data block 300 may be replaced with the sequence ESC ESC_ESC. In this manner, any possible confusion that may arise as to the beginning and end of the WCI data block 300 is eliminated. It should also be noted that the protocol defined by the SLIP, particularly the RFC 1055, is only exemplary. The device and method may utilize any manner of indicating the beginning and end of the WCI data block 300.

The WCI data block 300 may be formatted into individual pairs of UART messages 200 for each byte of the WCI data block 300. That is, each byte of the WCI data block 300 is converted into a corresponding pair of UART messages 200. Each UART message 200 of the WCI data block 300 may be placed in a predetermined order in the first queue for transmission over the WCI pathway 155. When the Type 2 messages are allowed transmission, the UART messages 200 of the WCI data block 300 may be transmitted in the order placed in the first queue over the WCI pathway 155. As described above, when a Type X message is detected, the first queue of Type 2 messages is suspended such that this Type X message is transmitted with priority. When no Type X messages are detected, the first queue resumes its transmission of the Type 2 messages including the UART messages 200 of the WCI data block 300.

With regard to the receiving end of the UART messages 200 representing the WCI data block 300, a Type 2 message extraction mechanism may be utilized. Because of the possibility of the Type 2 messages embodied as UART messages 200 representing the WCI data block 300 may arrive at the destination with Type X messages interleaved (e.g., Type X message exists during transmission of the Type 2 messages of the WCI 300), the extraction mechanism separates the Type 2 messages from the Type X messages.

Again, the Type 2 messages may be recognized using the bits 210-220 of each UART message 200. When the bits 210-220 indicate that the UART message 200 is a Type 2 message, these UART messages 200 may be separated. The separation may be performed using the hardware, a software, or a combination thereof. For example, a dedicated hardware circuit may direct incoming messages across the WCI pathway 155 to a queue specially reserved for Type 2 messages. The nibbles carried by the Type 2 messages may then be assembled into the bytes of the WCI data block 300 using the SLIP. The hardware circuit may forward the Type X messages immediately to the recipient without placement into the queue.

As described above, the presence of the two end fields 305, 330 identify the beginning and the end, respectively, of the WCI data block 300. Thus, when the pair of UART messages 200 that is the first end field 305 is identified, the next set of UART messages 200 are known to be the type field 310, the length field 315, the data field 320, and the CRC field 325. When the pair of UART messages 200 that is the second end field 330 is identified, the end of the WCI data block 300 is known. Using the presence of the two end fields 305, 330, the extraction of the WCI data block 300 in the TLV format may be performed. As the data in the fields are extracted and converted into the WCI data block 300, the extraction mechanism may identify the CRC field 325 as the pair of UART messages 200 (or more depending on the size of the CRC field 325) preceding the second end field 330. The extraction mechanism may utilize the data of the CRC field 325 to validate the integrity of the WCI data block 300. If the WCI data block 300 is validated, the data of the type field 310 may be used to indicate the final destination of the message of the data field 320 such that the message if forwarded accordingly. If the extraction mechanism uses the CRC field 325 to determine that the WCI data block 300 is not validated, the data may be discarded. It should be noted that the discarded data may also be ignored or a variant of an acknowledgement/negative-acknowledgement (ACK/NACK) protocol may be overlaid on the basic SLIP. Once these steps have been performed, the transmission of the WCI data block 300 over the WCI pathway 155 is completed. Thus, the asynchronous block data transfer is performed via the WCI pathway 155 that bypasses the requirement of the applications processor 105.

Figure 4:
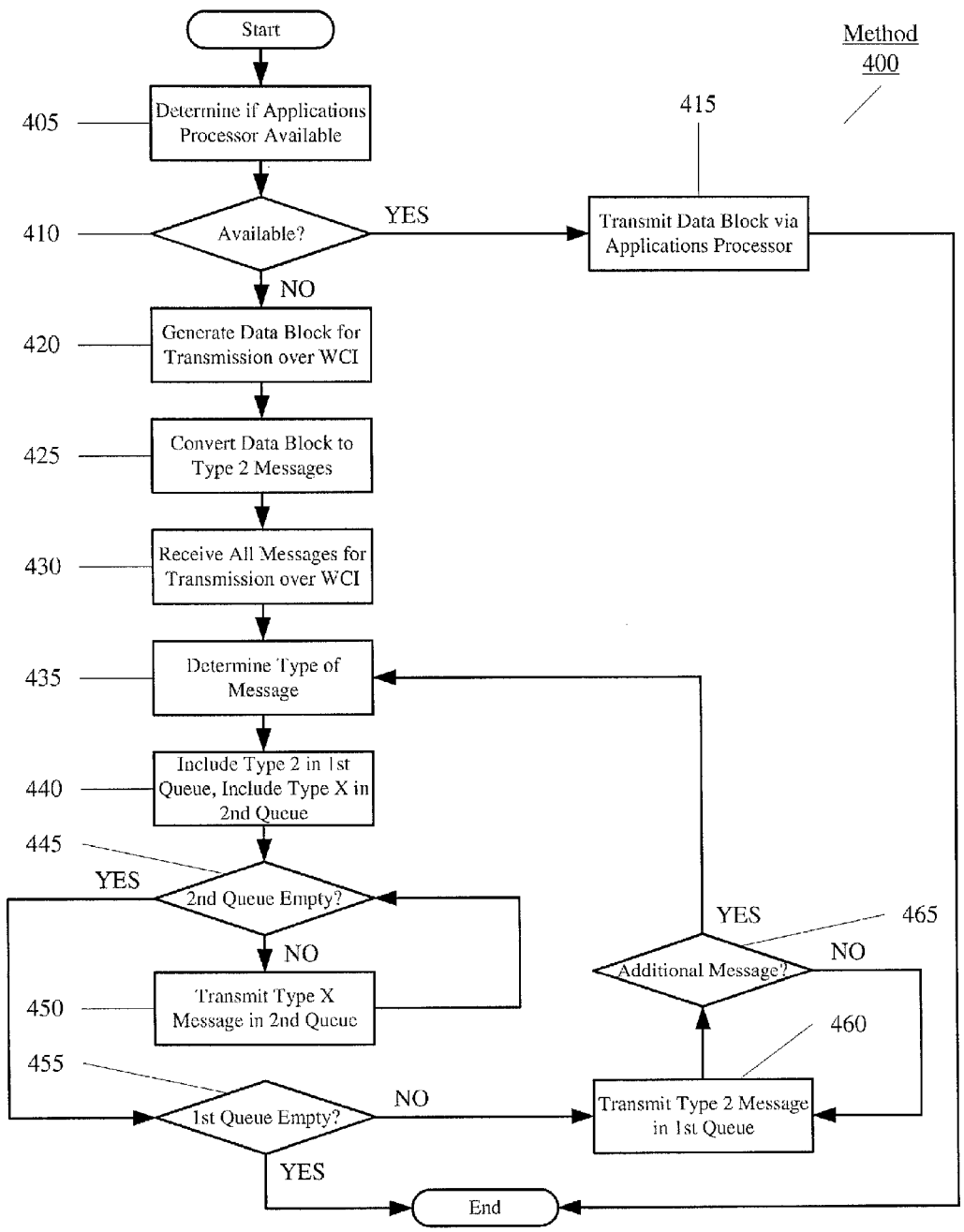
FIG. 4 shows an exemplary method for transmitting messages over the WCI.

FIG. 4 shows an exemplary method 400 for transmitting messages over the WCI pathway 155. The method 400 may be implemented in hardware such as the UART, in software that includes a set of instructions for steps as described below, or a combination of hardware and software. The method 400 relates specifically to the process of transmitting UART messages 200 that are either Type X messages or Type 2 messages over the WCI pathway 155. The method 400 will be described with reference to the station 100 of FIG. 1, the UART message 200 of FIG. 2, and the WCI data block 300 of FIG. 3. For illustrative purposes, the method 400 will be described for a transmission process in which the cellular chip 130 transmits messages to the ISM chip 135. However, it should be noted that the transmission may be performed in which the ISM chip 135 transmits messages to the cellular chip 130.

In step 405, the cellular chip 130 determines whether the application processor 105 is available. As described above, the applications processor 105 may still be used. For example, when a sufficient power supply is available or if the applications processor 105 is already awake or a combination thereof, the data block may be transmitted via the applications processor 105. The applications processor 105 may have indicated to the cellular chip 130 of its current status (e.g., awake, asleep, waking, sleeping, etc.). Accordingly, the cellular chip 130 may be aware of whether the applications processor 105 is available.

In step 410, a determination is made whether the applications processor 105 is available. If the applications processor 105 is available, the method 400 continues to step 415. In step 415, the data block that is to be transmitted to the ISM chip 135 is transmitted via the applications processor 105. However, if the applications processor 105 is not available, the method 400 continues to step 420.

In step 420, the cellular chip 130 generates the WCI data block 300 for transmission over the WCI pathway 155. Specifically, the data block is converted into the TLV format of the WCI data block 300. Accordingly, information regarding the data block may be generated such that the type field 310, the length field 315, the data field 320, and the CRC field 325 may be generated. Subsequently, the WCI data block 300 may be generated.

In step 425, the cellular chip 130 converts the WCI data block 300 into UART messages 200 that are identifiable as Type 2 messages. As discussed above, each UART message 200 may utilize the bits 210-220 to indicate the type of message. Accordingly, each UART message 200 generated for the WCI data block 300 may include the bits 210-220 that have been set using a predetermined value such that the Type 2 message may be identified.

In step 430, the cellular chip 130 receives all messages that are to be transmitted to the ISM chip 135 via the WCI pathway 155. For example, the Type 2 messages of the WCI data block 300 may be received as well as any Type X messages that are to be transmitted to the ISM chip 135. Upon receiving the messages for transmission over the WCI pathway 155, in step 435, the cellular chip 130 determines the type of each received message. Thus, in step 4340, the cellular chip includes any Type 2 message in a first queue while including any Type X message in the second queue. As discussed above, the Type X messages in the second queue may be ordered based upon a priority of the Type X message type. Furthermore, the Type 2 messages included in the first queue may be ordered accordingly such that the transmission of these messages may result in proper extraction (as discussed below with regard to FIG. 5). That is, the first queue including the Type 2 messages may be ordered in a defined manner such that the WCI data block 300 encoded within the UART messages 200 of the Type 2 messages may be properly extracted.

In step 445, a determination is made whether the second queue is empty. Specifically, this determination relates to whether any Type X messages are present. If the second queue is not empty (i.e., there are Type X messages), the method 400 continues to step 450. In step 420, the Type X messages in the second queue begin transmitting across the WCI pathway 155. For example, the Type X messages are transmitted from the cellular chip 130 over the WCI pathway 155 to the ISM chip 135. As discussed above, the Type X message has a higher priority than Type 2 messages. Due to this priority, the Type X message is not interrupted by the Type 2 messages with regards to transmission. Accordingly, the method 400 returns to step 445 to determine whether the second queue is empty such that all Type X messages may be transmitted prior to any transmission of Type 2 messages.

Returning to step 445, if the second queue which may include Type X messages is empty, the method 400 continues to step 455. In step 455, a determination is made whether the first queue including any Type 2 messages is empty. If there are no Type 2 messages, the method 400 ends. However, if the first queue is not empty (i.e., there are Type 2 messages) such as the UART messages 200 for the WCI data block 300, the method 400 continues to step 460.

In step 460, the Type 2 messages of the first queue are transmitted over the WCI pathway 155. That is, the UART messages 200 of the Type 2 message representing the WCI data block 300 are transmitted over the WCI pathway 155 from, for example, the cellular chip 130 to the ISM chip 135. As discussed above, the WCI data block 300 may be converted into a plurality of Type 2 messages as UART messages 200. The Type 2 messages in the first queue may continue to transmit until completion or until a new message is determined to be present.

In step 465, a determination is made whether an additional message has been generated. If no new message is generated, the method 400 returns to step 460 for the Type 2 messages to continue transmitted. However, if a new message has been generated, the method 400 returns to step 435 in which steps 435-460 are repeated. In this manner, if the new message is a Type X message, it is placed into the second queue and transmitted prior to any further transmission of Type 2 messages. However, if the new message is a Type 2 message, it is simply placed at the end of the first queue such that the ordered list is not disrupted. It should be noted that since the Type 2 messages are no longer transmitted when the new message is a Type X message, the method 400 may include a further step. For example, after determining the type of the new message, if the determination indicates that the new message is a Type X message, the method 400 may include a step of suspending the transmission of Type 2 messages as they have already began transmitting.

Figure 5:
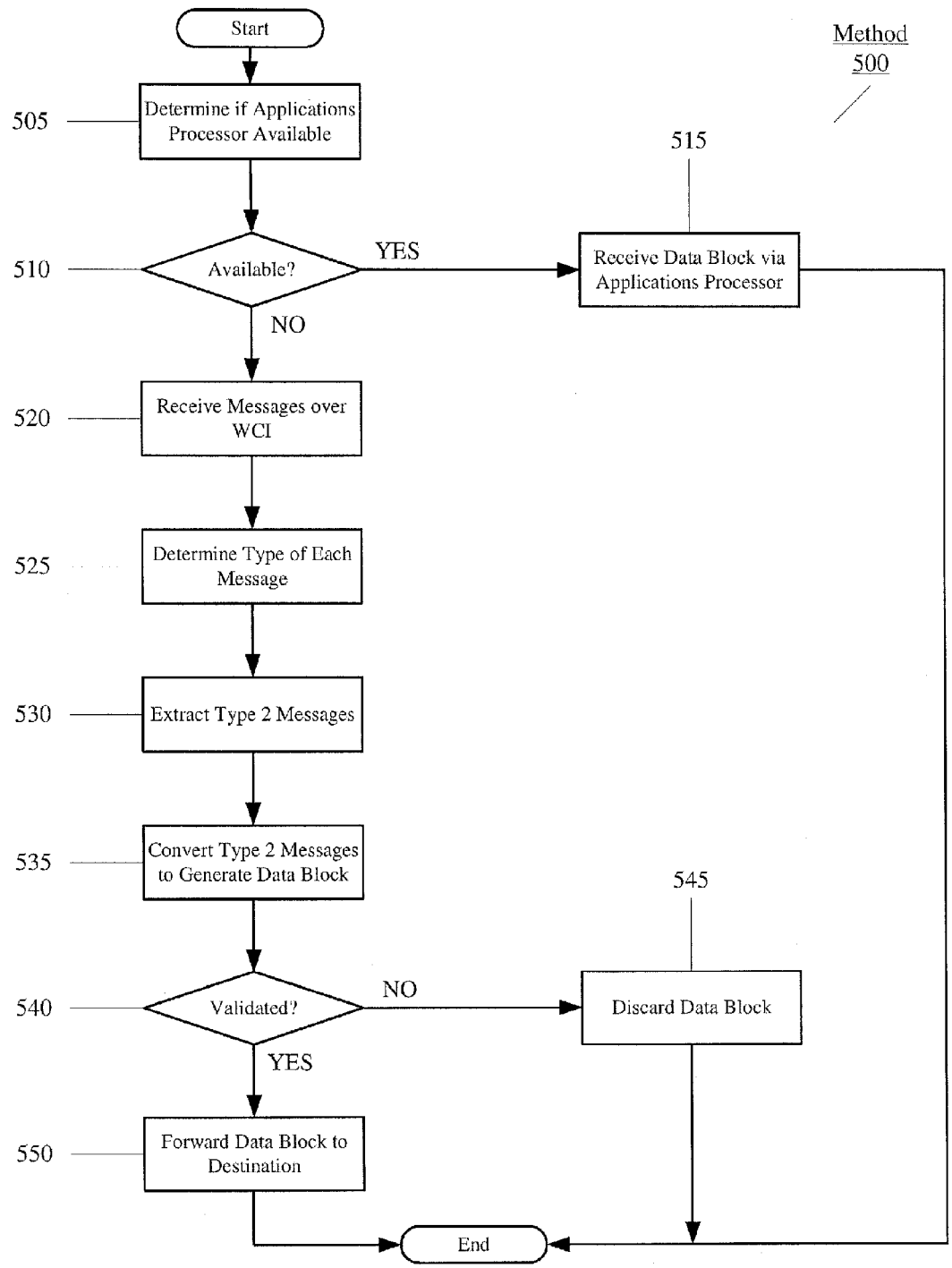
FIG. 5 shows an exemplary method for receiving messages over the WCI.

FIG. 5 shows an exemplary method 500 for transmitting messages over the WCI pathway 155. The method 500 may be implemented in hardware such as the UART, in software that includes a set of instructions for steps as described below, or a combination of hardware and software. The method 500 relates specifically to the process of receiving UART messages 200 that are either Type X messages or Type 2 messages over the WCI pathway 155. The method 500 will be described with reference to the station 100 of FIG. 1, the UART message 200 of FIG. 2, and the WCI data block 300 of FIG. 3. For illustrative purposes, the method 500 will be described for a receiving process in which the ISM chip 135 receives messages from the cellular chip 130.

In step 505, the ISM chip 135 determines whether the application processor 105 is available. Again, the applications processor 105 may still be used. The applications processor 105 may have indicated to the ISM chip 135 of its current status (e.g., awake, asleep, waking, sleeping, etc.). Accordingly, the ISM chip 135 may be aware of whether the applications processor 105 is available. In step 510, a determination is made whether the applications processor 105 is available. If the applications processor 105 is available, the method 500 continues to step 515. In step 415, the data block that is transmitted from the cellular chip 130 is received by the ISM chip 135 via the applications processor 105. However, if the applications processor 105 is not available, the method 500 continues to step 520.

In step 520, the ISM chip 135 receives the messages over the WCI pathway 155. That is, any Type X message and any Type 2 message transmitted over the WCI pathway 155 is received. In step 525, the ISM chip 135 determines the type of each received message. As discussed above, it is possible that Type X messages are interleaved among the Type 2 messages of the WCI data block 300. The bits 210-220 may again be used to determine which UART messages 200 are Type X messages and which UART messages 200 are Type 2 messages. In step 530, the ISM chip 135 may extract the Type 2 messages based upon the identified type of message. Through extraction, the Type 2 messages may be gathered in the order that they were received. The data within the UART messages 200 may begin to be extracted for concatenation to assemble the WCI data block 300. Thus, in step 535, the ISM chip 135 converts the Type 2 messages to generate the WCI data block 300. Specifically, when the first end field 305 is identified, the beginning of the WCI data block 300 may be identified. The UARTs 200 continue to be extracted until the entire WCI data block 300 is generated when the second end field 330 is identified.

In step 540, a determination is made whether the WCI data block 300 has been properly assembled. Specifically, the CRC field 325 may be used to validate whether the WCI data block 300 is properly extracted from the UART messages 200 as Type 2 messages. If the WCI data block 300 is not validated based upon the CRC field 325, the method 500 continues to step 545 where the WCI data block 300 is discarded. If the WCI data block 300 is validated, the method 500 continues to step 550 where the message is forwarded to the intended destination such that the actual data in the data field 320 may be used.

The exemplary embodiments provide a device and method for transmitting large data blocks over a WCI pathway between a cellular chip and an ISM chip that is normally used only for 1 or 2 byte long real-time messages. Using the standards set forth for use of the WCI pathway, the large data block may be converted into a WCI data block that is further converted into DART messages that are a Type 2 message that has been defined in the standards for use of the WCI pathway. A Type X message which is any real-time message has a higher priority than any Type 2 message. Thus, the device and method always transmit any Type X message prior to transmission of Type 2 messages. Even after the Type 2 messages have began transmitting over the WCI pathway, the transmission thereof is suspended such that any further Type X message that is present is transmitted. Once all the Type 2 messages of the WCI data block are received, the WCI data block may be reassembled as a concatenation of the UARTs as Type 2 messages. Therefore, an applications processor that is normally utilized for transmission of the large data blocks is not required as only the direct WCI pathway is utilized. The manner of using the WCI pathway, particularly for the real-time messages, is not affected as well. That is, the real-time messages are still transmitted once available for transmission such that the chips may operate in view of the control information of the real-time messages.

It is again noted that the exemplary device and method may still utilize the applications processor such that the above described mechanism using the WCI pathway may only be used for the standard real-time messages. If the station has no issues regarding a power supply (e.g., a continuous supply of power provided, full battery life, etc.), the applications processor may be relied upon, even woken up for use. If the applications processor is already awake and consuming power, it may be used for the transmission of the large data block. Accordingly, the exemplary device and method may utilize the WCI pathway for transmission of the large data block when power consumption issues are present or when the applications processor is determined to be asleep.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method comprising:
  generating a first data block for transmission between a cellular chip and an Industrial, Scientific, and Medical (ISM) chip;
  converting the first data block into a plurality of first messages, the first messages having a format corresponding to a wireless coexistence interface (WCI) pathway, the WCI pathway directly communicatively connecting the cellular chip and the ISM chip, the format being based upon a Universal Asynchronous Receiver/Transmitter (UART) format and including a field having data that indicates a message type, the first messages being a first message type;
  generating a first queue for the first messages;
  generating a second data block for transmission over the WCI pathway;
  converting the second data block into a second message, the second message being of a second message type;
  generating a plurality of second queues for the second messages;
  transmitting the first messages over the WCI pathway; and
  generating the first data block based upon a concatenation of the first messages.

2. The method of claim 1, wherein
  the second message has a format corresponding to the WCI pathway, and the second message type has a higher priority than the first message type.

3. The method of claim 2, further comprising:
  transmitting the first messages over the WCI pathway based upon the first queue;
  suspending the transmission of the first messages when the second queue includes the second message;
  transmitting the second message over the WCI pathway based upon the second queue; and
  resuming the transmission of the first messages based upon the first queue.

4. The method of claim 2, wherein the first data block is non-real-time data including operational information related to at least one of the cellular chip and the ISM chip, wherein the second data block is real-time data including control information.

5. The method of claim 1, wherein the format corresponding to the WCI pathway is based upon the Universal Asynchronous Receiver/Transmitter (UART) format having ten (10) bits, a first bit indicating a start, a tenth bit indicating a stop, and second to fourth bits indicating the message type.

6. The method of claim 1, wherein the first data block has a Type-Length-Value (TLV) format, the TLV format including a type field indicating a type of data included in the first data block, a length field indicating a total length of portions of the first data block, a data field including the data, and a checksum field used to indicate a validity of the first data block.

7. The method of claim 6, wherein the TLV format includes a first end field and a second end field at opposing ends, the first end field indicating a beginning of the first data block, the second end field indicating an end of the first data block, wherein the first and second end fields are based upon a Serial Line Interface Protocol (SLIP).

8. The method of claim 6, wherein the checksum field includes a Cyclic Redundancy Check (CRC).

9. The method of claim 1, further comprising:
  determining whether an applications processor is awake, the applications processor configured to transmit messages of the first message type, a cellular pathway communicatively connecting the cellular chip to the applications processor, an ISM pathway communicatively connecting the ISM chip to the applications processor;
  transmitting the first message via the applications processor, the cellular pathway, and the ISM pathway when the applications processor is awake.

10. The method of claim 1, wherein the field includes at least one bit and the data is a setting of the at least one bit.

11. The method of claim 1, wherein each of the plurality of second queues has a corresponding priority and each of the second messages is placed, based on a respective priority, into the corresponding one of the plurality of the second queues.

12. The method of claim 1, wherein there are a predetermined number of types of second messages and a number of the plurality second queues corresponds to the predetermined number.

13. A transceiver device configured to communicate wireless data using a plurality of different protocols, comprising:
  a cellular chip configured to communicate the wireless data with a cellular network;
  an Industrial, Scientific, and Medical (ISM) chip configured to communicate the wireless data with at least one of a WiFi network and as a short range transmission; and
  a wireless coexistence interface (WCI) pathway, the WCI pathway directly communicatively connecting the cellular chip and the ISM chip,
  wherein a first data block is generated for transmission between the cellular chip and the ISM chip,
  wherein the first data block is converted into a plurality of first messages, the first messages having a format corresponding to the WCI pathway, the format being based upon a Universal Asynchronous Receiver/Transmitter (UART) format and including a field having data that indicates a message type, the first messages being of a first message type,
  wherein a first queue is generated for the first messages,
  wherein a second data block is generated for transmission over the WCI pathway, and
  wherein the second data block is converted into a second message, the second message being associated with a second message type,
  wherein a second queue is generated for the second message, and
  wherein the first messages are transmitted over the WCI pathway such that the first data block is generated based at least in part upon a concatenation of the first messages.

14. The transceiver device of claim 13, wherein the second message has a format corresponding to the WCI pathway and the second message type has a higher priority than the first message type.

15. The transceiver device of claim 14, wherein the first messages are transmitted over the WCI pathway based upon the first queue, wherein the transmission of the first messages is suspended when the second queue includes the second message, wherein the second message is transmitted over the WCI pathway based upon the second queue, and wherein the transmission of the first messages is resumed based upon the first queue.

16. The transceiver device of claim 14, wherein the first data block is non-real-time data including operational information related to at least one of the cellular chip and the ISM chip, wherein the second data block is real-time data including control information.

17. The transceiver device of claim 13, wherein the format corresponding to the WCI pathway is based upon the Universal Asynchronous Receiver/Transmitter (UART) format having ten (10) bits, a first bit indicating a start, a tenth bit indicating a stop, and second to fourth bits indicating the message type.

18. The transceiver device of claim 13, wherein the first data block has a Type-Length-Value (TLV) format, the TLV format including a type field indicating a type of data included in the first data block, a length field indicating a total length of portions of the first data block, a data field including the data, and a checksum field used to indicate a validity of the first data block.

19. The transceiver device of claim 18, wherein the TLV format includes a first end field and a second end field at opposing ends, the first end field indicating a beginning of the first data block, the second end field indicating an end of the first data block.

20. The transceiver device of claim 19, wherein the first and second end fields are based upon a Serial Line Interface Protocol (SLIP).

21. The transceiver of claim 13, wherein the ISM chip is one of a Bluetooth chip or a WiFi chip.

22. A non-transitory computer readable storage medium with an executable program stored thereon, wherein the program instructs a microprocessor to perform operations comprising:
generating a first data block for transmission between a cellular chip and an Industrial, Scientific, and Medical (ISM) chip;
converting the first data block into a plurality of first messages, the first messages having a format corresponding to a wireless coexistence interface (WCI) pathway, the WCI pathway directly communicatively connecting the cellular chip and the ISM chip, the format being based upon a Universal Asynchronous Receiver/Transmitter (UART) format and including a field having data that indicates a message type, the first messages being of a first message type;
generating a first queue for the first messages;
generating a second data block for transmission over the WCI pathway;
converting the second data block into a second message, the second message being of a second message type;
generating a plurality of second queues for the second messages;
transmitting the first messages over the WCI pathway; and
generating the first data block based at least in part upon a concatenation of the first messages.

* * * * *